(12) United States Patent
Discekici et al.

(10) Patent No.: US 12,447,672 B2
(45) Date of Patent: Oct. 21, 2025

(54) THREE-DIMENSIONAL PRINTING

(71) Applicant: PERIDOT PRINT LLC, Palo Alto, CA (US)

(72) Inventors: Emre Hiro Discekici, San Diego, CA (US); Shannon Reuben Woodruff, San Diego, CA (US); Krzysztof Nauka, Palo Alto, CA (US); Vladek P. Kasperchik, Corvallis, OR (US)

(73) Assignee: Peridot Print LLC, Palo Alto, CA (US)

( * ) Notice: Subject to any disclaimer, the term of this patent is extended or adjusted under 35 U.S.C. 154(b) by 348 days.

(21) Appl. No.: 17/298,637

(22) PCT Filed: Apr. 24, 2020

(86) PCT No.: PCT/US2020/029829
§ 371 (c)(1),
(2) Date: May 31, 2021

(87) PCT Pub. No.: WO2020/251661
PCT Pub. Date: Dec. 17, 2020

(65) Prior Publication Data

US 2022/0119622 A1  Apr. 21, 2022
US 2025/0066583 A9  Feb. 27, 2025

Related U.S. Application Data

(63) Continuation-in-part of application No. PCT/IB2019/001327, filed on Jun. 10, 2019.

(51) Int. Cl.
*B29C 64/165* (2017.01)
*B33Y 70/10* (2020.01)
(Continued)

(52) U.S. Cl.
CPC ............ *B29C 64/165* (2017.08); *B33Y 70/10* (2020.01); *C08K 3/22* (2013.01); *C08K 5/25* (2013.01);
(Continued)

(58) Field of Classification Search
CPC . C08K 5/25; C08K 3/22; B33Y 10/00; B33Y 70/10; B29C 64/165; C08L 77/02
See application file for complete search history.

(56) References Cited

U.S. PATENT DOCUMENTS 2,724,706 A   11/1955   Bersworth
3,284,234 A   11/1966   Hervey et al.
(Continued)

FOREIGN PATENT DOCUMENTS

CN   101134841 A   3/2008
CN   101875745 A   11/2010
(Continued)

OTHER PUBLICATIONS

Tayca Corp data sheet for TiO2 (Year: 2024).*
(Continued)

*Primary Examiner* — Arrie L Reuther
(74) *Attorney, Agent, or Firm* — Dierker & Kavanaugh, P.C.

(57) ABSTRACT

An example of an ultraviolet (UV) light fusing agent for three-dimensional (3D) printing includes a vehicle and a multi-functional antioxidant and UV light absorber dispersed in the vehicle. The vehicle includes water and a water miscible or water soluble organic solvent. The multi-functional antioxidant and UV light absorber includes a metal oxide particle that is to absorb UV radiation having a wavelength within a range from about 330 nm to about 405 nm and a passivating agent complexed with at least a portion of a surface of the metal oxide.

12 Claims, 5 Drawing Sheets

(51) Int. Cl.
   *C08K 3/22*  (2006.01)
   *C08K 5/25*  (2006.01)
   *C08L 77/02* (2006.01)
   *B29K 77/00* (2006.01)
   *B33Y 10/00* (2015.01)
   *B33Y 70/00* (2020.01)

(52) U.S. Cl.
   CPC .......... *C08L 77/02* (2013.01); *B29K 2077/00* (2013.01); *B33Y 10/00* (2014.12); *B33Y 70/00* (2014.12)

(56) References Cited

U.S. PATENT DOCUMENTS

| | | |
|---|---|---|
| 3,660,438 A | 5/1972 | Martin |
| 3,826,752 A | 7/1974 | Rody et al. |
| 4,012,360 A | 3/1977 | Schwarzenbach et al. |
| 4,147,689 A | 4/1979 | Thompson et al. |
| 4,447,571 A | 5/1984 | Dabi et al. |
| 4,801,749 A | 1/1989 | Kazmierczak et al. |
| 5,216,078 A | 6/1993 | Cook et al. |
| 6,811,597 B2 | 11/2004 | Oki et al. |
| 8,592,549 B1 | 11/2013 | Grcev et al. |
| 10,030,154 B2 | 7/2018 | Naruse et al. |
| 12,227,659 B2 | 2/2025 | Discekici et al. |
| 12,280,543 B2 | 4/2025 | Discekici et al. |
| 2006/0052260 A1 | 3/2006 | Duyck et al. |
| 2010/0212930 A1 | 8/2010 | Yasumoto et al. |
| 2011/0224074 A1 | 9/2011 | Okada et al. |
| 2016/0272817 A1 | 9/2016 | Naruse et al. |
| 2018/0022923 A1 | 1/2018 | Emamjomeh et al. |
| 2018/0119017 A1 | 5/2018 | Schlosser et al. |
| 2018/0272607 A1 | 9/2018 | Chaffins et al. |
| 2019/0036414 A1 | 1/2019 | Ludois et al. |
| 2019/0061236 A1 | 2/2019 | Rantala et al. |
| 2020/0016827 A1 | 1/2020 | Yamashita et al. |
| 2021/0354196 A1 | 11/2021 | Chen |
| 2022/0049120 A1 | 2/2022 | Woodruff et al. |
| 2022/0056284 A1 | 2/2022 | Discekici et al. |
| 2022/0089892 A1 | 3/2022 | Discekici et al. |
| 2024/0059009 A1 | 2/2024 | Discekici et al. |
| 2025/0206973 A1 | 6/2025 | Discekici et al. |

FOREIGN PATENT DOCUMENTS

| | | | | |
|---|---|---|---|---|
| CN | 102226799 A | | 10/2011 | |
| CN | 103242729 A | * | 8/2013 | |
| CN | 103556459 A | | 2/2014 | |
| CN | 103819647 | | 5/2014 | |
| CN | 104628933 A | | 5/2015 | |
| CN | 104736639 A | | 6/2015 | |
| CN | 105648793 A | | 6/2016 | |
| CN | 107915940 A | | 4/2018 | |
| CN | 109789633 A | | 5/2019 | |
| IN | 105295354 A | | 2/2016 | |
| JP | S51-068650 A | | 6/1976 | |
| JP | 10168423 | | 6/1998 | |
| JP | 2005023027 A | * | 1/2005 | |
| JP | 2018-158571 A | | 10/2018 | |
| KR | 20150112390 | | 10/2015 | |
| WO | 2004/076419 A1 | | 9/2004 | |
| WO | 2009/000660 A2 | | 12/2008 | |
| WO | WO-2017018985 A1 | * | 2/2017 | .............. B22F 10/10 |
| WO | WO-2017069752 A1 | * | 4/2017 | ............. B28B 1/001 |
| WO | 2018/003512 A1 | | 1/2018 | |
| WO | 2018/173755 A1 | | 9/2018 | |
| WO | WO-2019078855 A1 | | 4/2019 | |
| WO | 2019/108201 A1 | | 6/2019 | |
| WO | WO-2019182627 A1 | | 9/2019 | |

OTHER PUBLICATIONS

Wang CN 103,242,729 A (trans.) (Year: 2013).*
Kujira JP-2005023027 A (trans.) (Year: 2005).*
U.S. Appl. No. 17/294,194, filed May 14, 2021, Woodruff, B29C64/165.*
He, et al., Thermal stability and yellowing of polyamide finished with a compound anti-thermal-yellowing agent, The Journal of The Textile institute, vol. 106, 2015—Issue 12, 3 pages.
National Institute of Advanced Industrial Science and Technology (AIST), SDBS-2625, SDBS AIST Database, 2 pages, 1999.

* cited by examiner

*Fig-3A*  *Fig-3B*
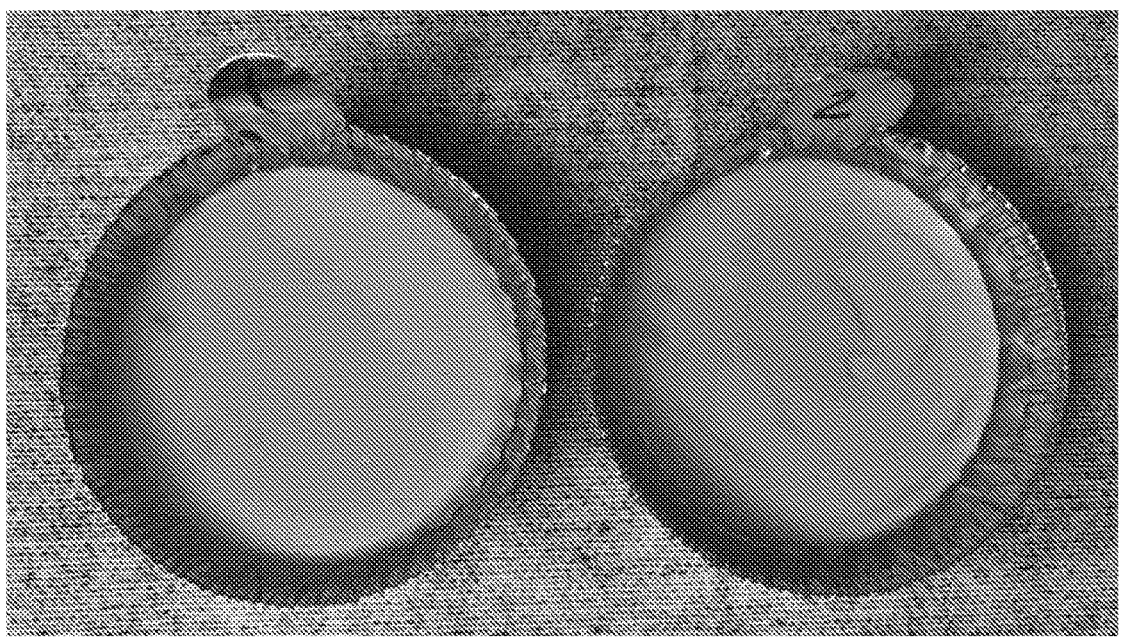
*Fig-4A*  *Fig-4B*

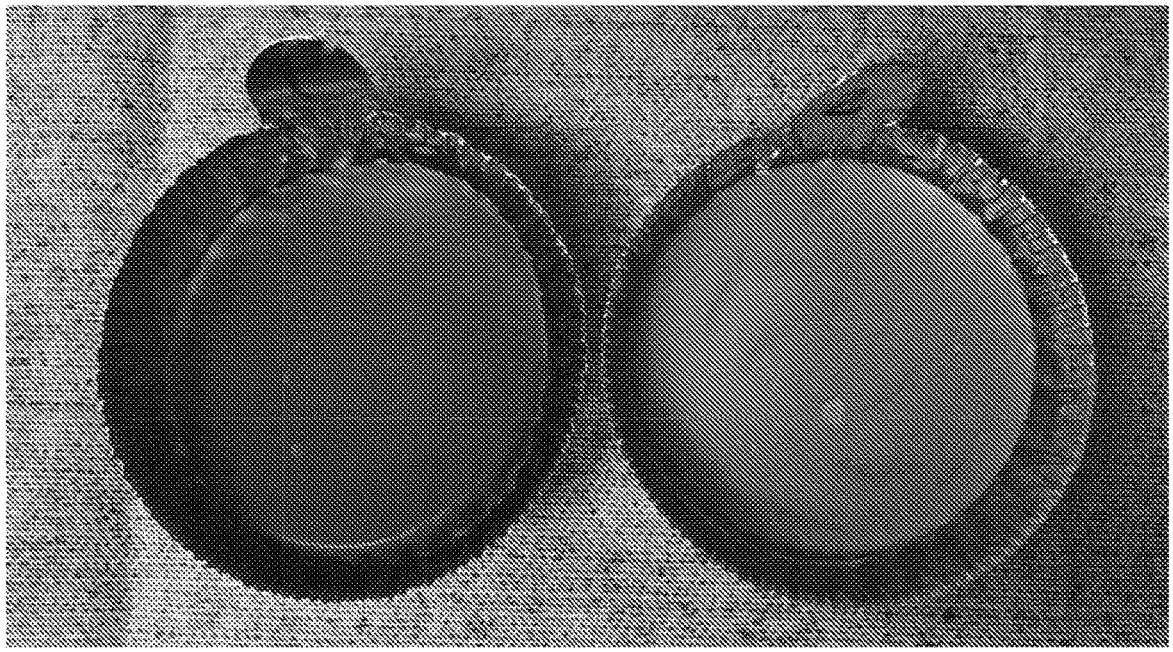
*Fig-5A*  *Fig-5B*
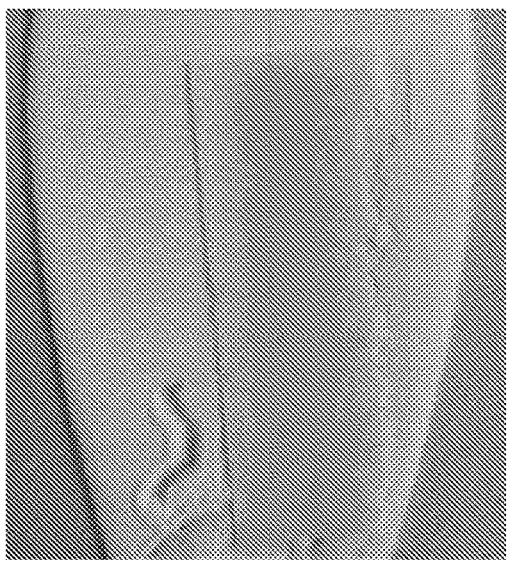 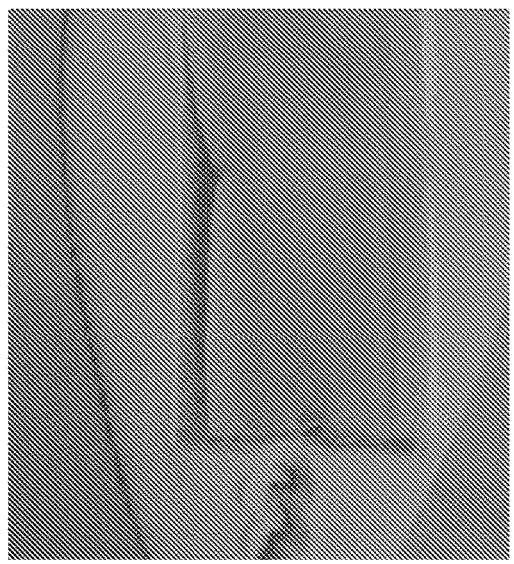
*Fig-6A*  *Fig-6B*

THREE-DIMENSIONAL PRINTING

CROSS-REFERENCE TO RELATED APPLICATIONS

This application claims priority to International Patent Application Number PCT/US2019/036409, filed Jun. 10, 2019; the disclosure of which is incorporated by reference herein in its entirety.

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 3A and 3B are black and white reproductions of originally colored photographs of, respectively, a comparative example disc (formed with a comparative fusing agent and melting) and an example disc (formed with an example fusing agent and melting);

FIGS. 4A and 4B are black and white reproductions of originally colored photographs of, respectively, the comparative example disc of FIG. 3A and the example disc of FIG. 3B after 4 hours of oven aging;

FIGS. 5A and 5B are black and white reproductions of originally colored photographs of, respectively, the comparative example disc of FIG. 3A and the example disc of FIG. 3B after 20 hours of oven aging;

FIGS. 6A and 6B are black and white reproductions of originally colored photographs of, respectively, a comparative example 3D printed object layer (formed with the comparative fusing agent and 1 second of ultraviolet (UV) radiation exposure) and an example 3D printed object layer (formed with the example fusing agent and 1 second of UV radiation exposure)

DETAILED DESCRIPTION

Figure 1:
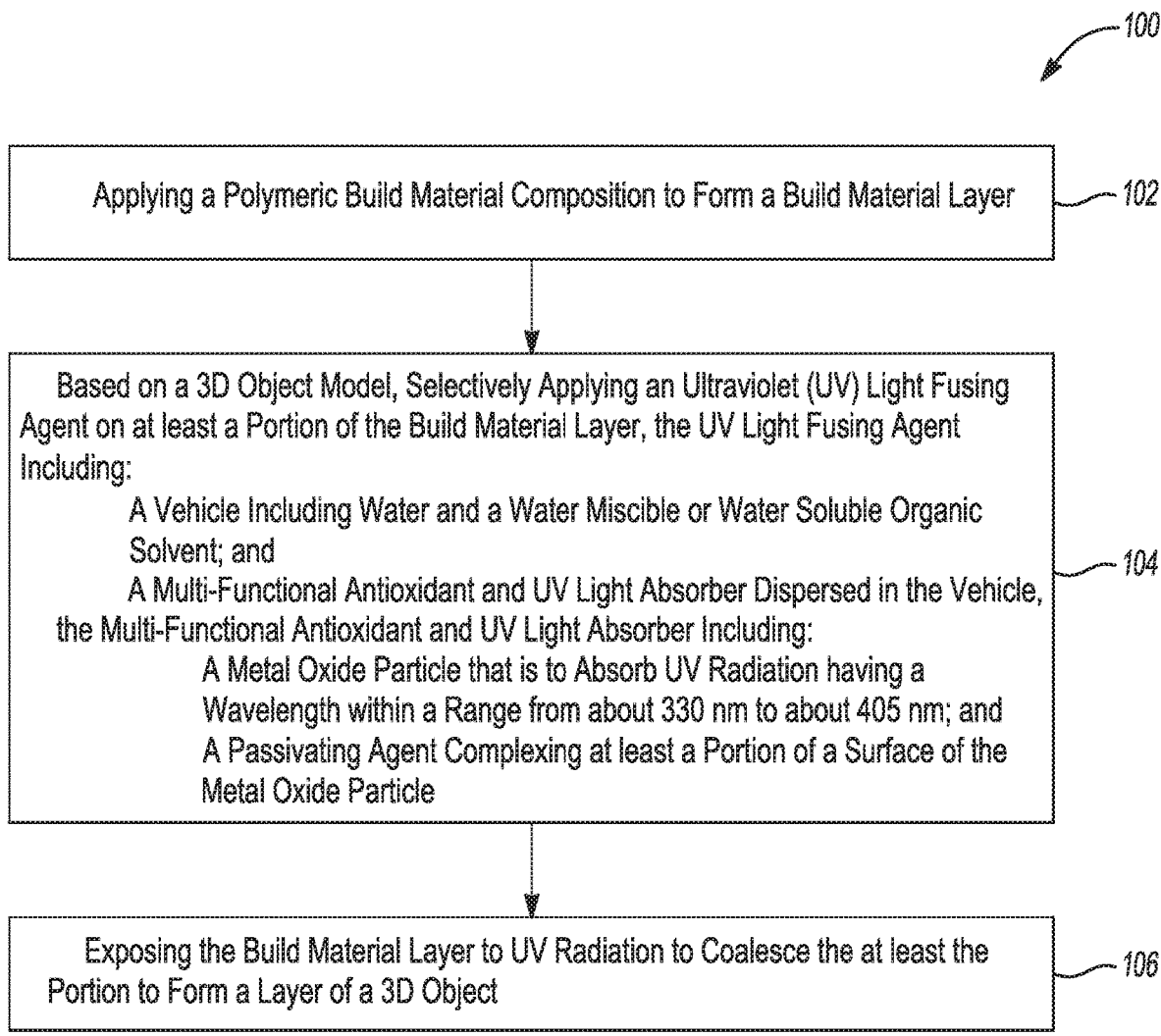
FIG. 1 is a flow diagram depicting an example of a 3D printing method.

Some three-dimensional (3D) printing methods utilize a fusing agent, which includes an energy absorber, to pattern polymeric build material. In these examples, an entire layer of the polymeric build material is exposed to electromagnetic radiation, but the patterned region (which, in some instances, is less than the entire layer) of the polymeric build material is fused/coalesced and hardened to become a layer of a 3D part. In the patterned region, the fusing agent is capable of at least partially penetrating into voids between the polymeric build material particles, and is also capable of spreading onto the exterior surface of the polymeric build material particles. The energy absorber in the fusing agent is capable of absorbing radiation and converting the absorbed radiation to thermal energy, which in turn fuses/coalesces the polymeric build material that is in contact with the fusing agent. Fusing/coalescing causes the polymeric build material to join or blend to form a single entity (i.e., the layer of the 3D part). Fusing/coalescing may involve at least partial thermal merging, melting, binding, and/or some other mechanism that coalesces the polymeric build material to form the layer of the 3D part.

In this type of printing process, infrared and/or visible radiation is/are often used, as opposed to ultraviolet (UV) radiation. This may be due, in part, to the contribution of UV radiation exposure to polymeric build material degradation. For example, metal-oxide catalyzed degradation of the polymeric build material and/or radical-based degradation of the polymeric build material may result from prolonged UV radiation exposure. Polymer degradation may cause discoloration (e.g., yellowing or browning) of the 3D printed object and/or may reduce the quality of the 3D printed object.

A fusing agent is disclosed herein that includes a multi-functional antioxidant and UV light absorber. As such, the fusing agent is a dual purpose agent in that its energy absorber is capable of both UV-based coalescence and mitigation of polymeric build material degradation. The multi-functional fusing agent is jettable, which enables controlled application of the formulation at the voxel level. The ability to jet the multi-functional antioxidant and UV light absorber in the fusing agent during the 3D print process may help to stabilize the polymeric build material as printing is performed, and thus may reduce the discoloration and improve the quality of 3D printed objects.

Throughout this disclosure, a weight percentage that is referred to as "wt % active" refers to the loading of an active component of a dispersion or other formulation that is present, e.g., in the fusing agent, detailing agent, etc. For example, a metal oxide particle, such as titanium dioxide, may be present in a water-based formulation (e.g., a stock solution or dispersion) before being incorporated into the fusing agent vehicle. In this example, the wt % actives of the titanium dioxide accounts for the loading (as a weight percent) of the titanium dioxide solids that are present in the fusing agent, and does not account for the weight of the other components (e.g., water, etc.) that are present in the stock solution or dispersion with the titanium dioxide. The term "wt %," without the term actives, refers to either i) the loading (in the fusing agent, etc.) of a 100% active component that does not include other non-active components therein, or ii) the loading (in the fusing agent, etc.) of a material or component that is used "as is" and thus the wt % accounts for both active and non-active components.

3D Printing Kits and 3D Printing Multi-Fluid Kits

The fusing agent disclosed herein may be included in a 3D printing kit or a multi-fluid kit for 3D printing.

An example of a 3D printing kit includes a polymeric build material composition; and an ultraviolet (UV) light fusing agent, including: a vehicle including water and a water miscible or water soluble organic solvent, and a multi-functional antioxidant and UV light absorber dispersed in the vehicle, the multi-functional antioxidant and UV light absorber including: a metal oxide particle that is to absorb UV radiation within a wavelength range of about 330 nm to about 405 nm and a passivating agent complexed with at least a portion of a surface of the metal oxide particle. Some examples of the 3D printing kit include a colored ink selected from the group consisting of a black ink, a cyan ink, a magenta ink, or a yellow ink; or a detailing agent including a surfactant, a co-solvent, and water; or both the colored ink and the detailing agent.

An example of the multi-fluid kit for 3D printing may include an ultraviolet (UV) light fusing agent, including: a vehicle including water and a water miscible or water soluble organic solvent, and a multi-functional antioxidant and UV light absorber dispersed in the vehicle, the multi-functional antioxidant and UV light absorber including: a metal oxide particle that is to absorb UV radiation having a wavelength within a range from about 330 nm to about 405 nm and a passivating agent complexed with at least a portion of a surface of the metal oxide particle; a colored ink selected from the group consisting of a black ink, a cyan ink, a magenta ink, or a yellow ink; or a detailing agent including a surfactant, a co-solvent, and water; or both the colored ink and the detailing agent.

It is to be understood that the fluids of the multi-fluid kits or fluids and composition of the 3D printing kits may be maintained separately until used together in examples of the 3D printing method disclosed herein. The fluids and/or compositions may each be contained in one or more containers prior to and during printing, but may be combined together during printing. The containers can be any type of a vessel (e.g., a reservoir), box, or receptacle made of any material.

As used herein, it is to be understood that the terms "set" or "kit" may, in some instances, be synonymous with "composition."

As mentioned, various fluids and/or composition(s) may be included in the fluid kits and/or 3D printing kits disclosed herein. Example compositions of the fusing agent, the detailing agent, the colored ink, and the build material composition will now be described.

Fusing Agent

The ultraviolet (UV) light fusing agent disclosed herein includes a vehicle, which includes water and a water miscible or water soluble organic solvent; and a multi-functional antioxidant and UV light absorber dispersed in the vehicle, the multi-functional antioxidant and UV light absorber including a metal oxide particle that is to absorb UV radiation having a wavelength within a range from about 330 nm to about 405 nm and a passivating agent complexed with at least a portion of a surface of the metal oxide particle. In some examples, the fusing agent consists of these components. In other examples, the fusing agent may include other additives, such as a surfactant, a dispersant, an anti-microbial agent, an anti-kogation agent, and/or a humectant.

Multi-Functional Antioxidant and UV Light Absorber

The multi-functional antioxidant and UV light absorber includes a metal oxide particle and a passivating agent complexed with at least a portion of a surface of the metal oxide particle. Within the fusing agent vehicle, the passivating agent may chelate with the catalytic surface groups (e.g., metal ion(s)) of the metal oxide particles. As such, the passivating agent may block at least some of the metal oxide particle surface groups. The passivating agent may form a partition between the catalytic surface groups and the polymeric build material during the 3D printing process, and may act as surface-active oxygen scavengers that can reduce the oxidative degradation at the surface of the polymeric build material particles during UV exposure.

The metal oxide particle in the fusing agent may be referred to as "a metal oxide particle." This does not mean that there is a single metal oxide particle in the formulation, but rather that the formulation may include a plurality of metal oxide particles of the same chemical composition.

The metal oxide particles in the fusing agent may be any white or optically transparent metal oxide that is to absorb UV radiation having a wavelength within a range from about 330 nm to about 405 nm. The phrase "that is to absorb UV radiation having a wavelength within a range from about 330 nm to about 405 nm" means that the metal oxide particle is capable of absorbing UV radiation that has any wavelength within the given range. Some metal oxide particles absorb at one of the wavelengths, and other metal oxide particles absorb at a plurality of the wavelengths. "Optically transparent" as used herein, can indicate that the metal oxide particles appear transparent when viewed by the naked eye and/or when applied to a polymer build material, and also do not provide strong coloration. In an example, the metal oxide particle is selected from the group consisting of titanium dioxide ($TiO_2$), zinc oxide (ZnO), cerium oxide ($CeO_2$), and combinations thereof.

These metal oxide particles can provide a temperature boosting capacity to the fusing agent that is sufficient to increase a temperature of the polymeric build material in contact with the fusing agent to or above the melting or softening point of the polymer build material. As used herein, "temperature boosting capacity" refers to the ability of the metal oxide particles to convert electromagnetic energy, e.g., ultraviolet light energy, into thermal energy to increase a temperature of the patterned portions of the polymeric build material over and above the temperature of the non-patterned portions of the polymeric build material. The polymeric build material coalesces when the temperature increases to or above the melting or softening temperature of the polymeric build material, although coalescence can also occur, in some instance, below the melting point. As used herein, "melting point" refers to the temperature at which a polymer transitions from a crystalline phase to a pliable, amorphous phase. Some polymers do not have a melting point, but rather have a range of temperatures over which the polymers soften. The "softening point," as used herein, refers to the temperature at which the polymer particles coalesce while portions of the polymeric build material that are not contacted by the fusing agent remain separate and loose.

In one example, metal oxide particles can have a temperature boosting capacity ranging from about 5° C. to about 30° C. for a polymeric build material with a melting or softening point ranging from about 25° C. to about 350° C. If the polymeric build material is at a temperature within about 5° C. to about 30° C. of the melting or softening point, then the metal oxide particles can boost the temperature of the patterned polymeric build material up to or above the melting or softening point of the polymeric build material, while the non-patterned polymer build material can remain at a lower temperature.

The temperature boosting capacity depends, in part, upon the loading of the metal oxide particles in the fusing agent and applied to the polymeric build material. Even at the relatively low loadings disclosed herein, the metal oxide particles exhibit the temperature boosting capacity.

The average particle size of the metal oxide particles may range anywhere from about 3 nm to about 950 nm. In one example, the average particle size ranges from about 5 nm to about 950. In another example, the average particle size ranges from about 100 nm to about 950. In other example, the average particle size ranges from about 3 nm to about 90. In still other examples, the average particle size ranges from about 50 nm to about 800 nm, from about 150 nm to about 750 nm, from about 200 nm to about 675 nm, or from about 100 nm to about 500 nm. The term "average particle size", as used herein, may refer to a volume-weighted mean diameter or a number-weighted mean diameter of a particle distribution.

The metal oxide particles may be incorporated into the fusing agent as part of a metal oxide dispersion. The metal oxide dispersion may include the metal oxide particles, a separate dispersant, and water or a combination of water and a water soluble or water miscible co-solvent.

In an example, the separate dispersant is citric acid, a non-ionic silane dispersing agent (e.g., those in the SILQUEST™ series by Momentive Performance Material, such as SILQUEST™ A-1230), or a combination thereof. It is to be understood that other suitable metal oxide dispersants may also be used. In some examples, the dispersant is present in an amount ranging from about 0.05 wt % active to about 30 wt % active, based on a total weight of the metal oxide dispersion. In other examples, the dispersant is present in an amount ranging from about 1 wt % active to about 25 wt % active, or from about 5 wt % active to about 20 wt % active, or from about from about 10 wt % active to about 30 wt % active, etc., each of which is based on a total weight of the metal oxide dispersion.

Some examples of the metal oxide dispersion include a water soluble or water miscible organic co-solvent. The water soluble or water miscible organic co-solvent in the metal oxide dispersion may include C2 to C10 alkylene diol, C3 to C10 alkylene triol, C4 to C10 alkylene glycol, or a mixture thereof. In an example, the organic co-solvent can be selected from 1,2-ethanediol, 1,2-propanediol, 1,3-propane diol, 2-methyl-1,3-propanediol, glycerol, propylene glycol, diethylene glycol, triethylene glycol, tetraethylene glycol, or a combination thereof. In yet another example, the organic co-solvent can include 1,2-ethanediol, 1,2-propanediol, 1,3-propane diol, 2-methyl-1,3-propanediol, glycerol, propylene glycol, diethylene glycol, triethylene glycol, tetraethylene glycol, dialcohols, trialcohols, polyalcohols, oligomeric glycol solvents, or a combination thereof. In a further example, the organic co-solvent can include propylene glycol. The water soluble or water miscible organic co-solvent may or may not be present in the metal oxide dispersion, and thus the amount may range from 0 wt % to about 30 wt %, based on a total weight of the metal oxide dispersion. When included, the amount of the water soluble or water miscible organic co-solvent may range from about 1 wt % to about 30 wt %, from about 5 wt % to about 25 wt %, etc., each of which is based on a total weight of the metal oxide dispersion.

The balance of the metal oxide dispersion is water (e.g., deionized water, purified water, etc.). The metal oxide dispersion may be added with the passivating agent and the other fusing agent vehicle components to form the fusing agent disclosed herein. Thus, the liquid components of the metal oxide dispersion become part of the fusing agent.

The amount of the metal oxide dispersion incorporated into the fusing agent will depend upon the loading of the metal oxide particles in the metal oxide dispersion, as well as the desirable loading of the metal oxide particles in the fusing agent. In an example, the metal oxide particles are present in the fusing agent an amount ranging from about 1 wt % active to about 12 wt % active, based on a total weight of the fusing agent. In other examples, the metal oxide particles are present in an amount ranging from about 3 wt % active to about 10 wt % active, or from about 5 wt % active to about 10 wt % active, based on a total weight of the fusing agent.

The passivating agent that is included in the fusing agent is one that functions as an antioxidant and can complex with at least some of the catalytic surface group(s) on the metal oxide particles. The complexation may take place once the components are mixed together to form the fusing agent. As such, the multi-functional antioxidant and UV light absorber may be formed in situ in the fusing agent.

In an example, the passivating agent is selected from the group consisting of a dihydrazide, a metal chelator, and combinations thereof.

The dihydrazide may be any water soluble or water dispersible compound that includes two hydrazide groups. In some examples, the dihydrazide can include sulfonohydrazide groups, while in other examples, the dihydrazide can include carbohydrazide groups. In an example, the passivating agent is the dihydrazide, and the dihydrazide is selected from the group consisting of adipic dihydrazide, carbohydrazide, oxalyl dihydrazide, succinic dihydrazide, isophthalic dihydrazide, azelaic dihydrazide, sebacic dihydrazide, dodecanedioic dihydrazide, terephthalic dihydrazide, oxbisbenzene sulfonylhydrazide, and a combination thereof.

The metal chelator may be any water soluble or water dispersible compound that combines with metal ions of the metal oxide particles to form a chelate or complex. In some examples, the metal chelator includes carboxylate functionalities. In an example, the passivating agent is the metal chelator, and the metal chelator is selected from the group consisting of citric acid, salicylates, ethylene diamine tetraacetic acid, pentetic acid, phosphonates (or phosphonic acids), a catechol, and combinations thereof. Some specific salicylates include sodium salicylate and methoxy salicylate.

The amount of the passivating agent incorporated into the fusing agent will depend upon the loading of the metal oxide particles in the fusing agent. In an example, the passivating agent is present in an amount ranging from about 1 wt % active to about 12 wt % active, based on a total weight of the fusing agent. In other examples, the passivating agent are present in an amount ranging from about 3 wt % active to about 10 wt % active, or from about 5 wt % active to about 10 wt % active, based on a total weight of the fusing agent.

Within the fusing agent, the metal oxide particles and the passivating agent are present in a weight ratio ranging from about 0.5:1 to about 1:0.5. In one example, the metal oxide particles and the passivating agent are present in a weight ratio of about 1:1. Any suitable amounts of the metal oxide particles and the passivating agent within the ranges provided may be used, as long as the desirable weight ratio of the components is achieved.

Fusing Agent Vehicle

In addition to the multi-functional antioxidant and UV light absorber (which includes the metal oxide particles and the passivating agent), the fusing agent also includes the vehicle, which includes water and a water miscible or water soluble organic solvent, and, in some instances, other additives.

The co-solvent in the fusing agent may be of the co-solvents listed for the metal oxide dispersion. In some examples, the organic co-solvent can exclude pyrrolidones, amines, lactams, and/or a combination thereof, as these co-solvent may contribute to polymer degradation during 3D printing. The amount of co-solvent in the fusing agent (not accounting for any that may be included with the dispersion) ranges from about 1 wt % to about 50 wt %, based on the total weight of the fusing agent. In other examples, the amount of co-solvent in the fusing agent may range from about 5 wt % to about 20 wt %, or from about 15 wt % to about 45 wt %, etc.

Suitable surfactant(s) for the fusing agent include non-ionic, anionic, or cationic surfactants. Some example surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, fluorosurfactants, and the like. Some specific examples include a self-emulsifiable, non-ionic wetting agent based on acetylenic diol chemistry (e.g., SURFYNOL® SEF from Evonik Degussa), a non-ionic fluorosurfactant (e.g., CAPSTONE® fluorosurfactants, such as CAPSTONE® FS-35, from Chemours), an ethoxylated low-foam wetting agent (e.g., SURFYNOL® 440 or SURFYNOL® CT-111 from Evonik Degussa), an ethoxylated wetting agent and molecular defoamer (e.g., SURFYNOL® 420 from Evonik Degussa), non-ionic wetting agents and molecular defoamers (e.g., SURFYNOL® 104E from Evonik Degussa), and/or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (organic surfactant) available from Evonik Degussa). Yet another suitable (anionic) surfactant includes alkyldiphenyloxide disulfonate (e.g., the DOWFAX™ series, such a 2A1, 3B2, 8390, C6L, C10L, and 30599, from The Dow Chemical Company).

Whether a single surfactant is used or a combination of surfactants is used, the total amount of surfactant(s) in the fusing agent may range from about 0.01 wt % active to about 3 wt % active based on the total weight of the fusing agent. In an example, the total amount of surfactant(s) in the fusing agent may be about 0.07 wt % active based on the total weight of the fusing agent.

The fusing agent vehicle may also include antimicrobial agent(s). Antimicrobial agents are also known as biocides and/or fungicides. Examples of suitable antimicrobial agents include the NUOSEPT® (Ashland Inc.), UCARCIDE™ or KORDEK™ or ROCIMA™ (The Dow Chemical Company), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (The Dow Chemical Company), and combinations thereof.

In an example, the total amount of antimicrobial agent(s) in the fusing agent ranges from about 0.01 wt % active to about 0.05 wt % active (based on the total weight of the fusing agent). In another example, the total amount of antimicrobial agent(s) in the fusing agent is about 0.04 wt % active (based on the total weight of the fusing agent).

The fusing agent vehicle may also include anti-kogation agent(s) that is/are to be jetted using thermal inkjet printing. Kogation refers to the deposit of dried printing liquid (e.g., fusing agent) on a heating element of a thermal inkjet printhead. Anti-kogation agent(s) is/are included to assist in preventing the buildup of kogation.

Examples of suitable anti-kogation agents include oleth-3-phosphate (commercially available as CRODAFOS™ O3A or CRODAFOS™ N-3A) or dextran 500k. Other suitable examples of the anti-kogation agents include CRODAFOS™ HCE (phosphate-ester from Croda Int.), CRODAFOS® O10A (oleth-10-phosphate from Croda Int.), or DISPERSOGEN® LFH (polymeric dispersing agent with aromatic anchoring groups, acid form, anionic, from Clariant), etc. It is to be understood that any combination of the anti-kogation agents listed may be used.

The anti-kogation agent may be present in the fusing agent in an amount ranging from about 0.1 wt % active to about 1.5 wt % active, based on the total weight of the fusing agent. In an example, the anti-kogation agent is present in an amount of about 0.5 wt % active, based on the total weight of the fusing agent.

The fusing agent vehicle may also include humectant(s). An example of a suitable humectant is ethoxylated glycerin having the following formula:

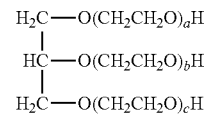

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

In an example, the total amount of the humectant(s) present in the fusing agent ranges from about 3 wt % active to about 10 wt % active, based on the total weight of the fusing agent.

The balance of the fusing agent(s) is water (e.g., deionized water, purified water, etc.), which as described herein, may vary depending upon the other components in the fusing agent(s).

Colorant

Some examples of the fusing agent do not include a colorant (e.g., pigment or dye). These example fusing agents are particularly suitable for generating white or off white parts.

Other examples of the fusing agent do include a colorant. The colorant may be included in the fusing agent to impart color to the entire 3D object. When color is desirable, incorporating the colorant into the fusing agent can speed up printing because a separate colored is not printed.

The colorant in the fusing agent may or may not function as a UV absorber. As such, the colorant may function as a UV absorber in addition to the multi-functional antioxidant and UV light absorber, or as a partial UV absorber in addition to the multi-functional antioxidant and UV light absorber, or may not provide any UV absorption in addition to the multi-functional antioxidant and UV light absorber.

The colorant of the colored ink may be any pigment or dye, including black pigments or dyes, cyan pigments or dyes, magenta pigments or dyes, yellow pigments or dyes, or a combination of colorants that together achieve a black, cyan, magenta, or yellow color.

When pigment is included in the fusing agent, it may be present in an amount ranging from about 1 wt % active to about 10 wt % active, based on a total weight of the fusing agent. When dye is included in the fusing agent, it may be present in an amount ranging from about 1 wt % active to about 7 wt % active, based on a total weight of the fusing agent.

Detailing Agent

Some examples of the multi-fluid kit and/or 3D printing kit include a detailing agent. The detailing agent may include a surfactant, a co-solvent, and a balance of water. In some examples, the detailing agent consists of these components, and no other components. In some other examples, the detailing agent may further include additional components, such as anti-kogation agent(s) and/or antimicrobial agent(s) (each of which is described above in reference to the fusing agent).

The surfactant(s) that may be used in the detailing agent include any of the surfactants listed herein in reference to the fusing agent. The total amount of surfactant(s) in the detailing agent may range from about 0.10 wt % to about 5 wt % with respect to the total weight of the detailing agent.

The co-solvent(s) that may be used in the detailing agent include any of the co-solvents listed above in reference to the fusing agent. The total amount of co-solvent(s) in the detailing agent may range from about 1 wt % to about 65 wt % with respect to the total weight of the detailing agent.

In the examples disclosed herein, the detailing agent does not include a colorant. In these examples, the detailing agent may be colorless, meaning that the detailing agent is achromatic and does not include a colorant.

The balance of the detailing agent is water. As such, the amount of water may vary depending upon the amounts of the other components that are included.

Colored Ink

Some examples of the multi-fluid kit and/or 3D printing kit include a colored ink. In these examples, the colored ink is separate from the fusing agent disclosed herein. A colored ink separate from the fusing agent may be desirable because the two agents can be applied separately, thus allowing control over where color is added. The colored ink may be applied during printing (e.g., on the polymeric build material with the fusing agent) or after printing (e.g., on a 3D printed object) to impart a colored appearance to the 3D printed object. The colored ink may include a colorant, a co-solvent, and a balance of water. In some examples, the colored ink consists of these components, and no other components. In still other examples, the colored ink may further include additional components that aid in colorant dispersability and/or ink jettability. Some examples of additional ink components include dispersant(s) (e.g., a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins), humectant(s), surfactant(s), anti-kogation agent(s), and/or antimicrobial agent(s) (some of which is described herein in reference to the fusing agent).

The colored ink may be a black agent, a cyan agent, a magenta agent, or a yellow agent. As such, the colorant may be a black colorant, a cyan colorant, a magenta colorant, a yellow colorant, or a combination of colorants that together achieve a black, cyan, magenta, or yellow color.

The colorant of the colored ink may be any pigment or dye. When the colored ink is separate agent, the pigment or dye is to impart color, and is not meant to replace the multi-functional antioxidant and UV light absorber in the fusing agent. As such, the colorant may function as a UV absorber or as a partial UV absorber, or may not provide any UV absorption.

An example of the pigment based colored ink may include from about 1 wt % to about 10 wt % of pigment(s), from about 10 wt % to about 30 wt % of co-solvent(s), from about 1 wt % to about 10 wt % of dispersant(s), 0.01 wt % to about 1 wt % of anti-kogation agent(s), from about 0.05 wt % to about 0.1 wt % antimicrobial agent(s), and a balance of water. An example of the dye based colored ink may include from about 1 wt % to about 7 wt % of dye(s), from about 10 wt % to about 30 wt % of co-solvent(s), from about 1 wt % to about 7 wt % of dispersant(s), from about 0.05 wt % to about 0.1 wt % antimicrobial agent(s), from 0.05 wt % to about 0.1 wt % of chelating agent(s), from about 0.005 wt % to about 0.2 wt % of buffer(s), and a balance of water.

Build Material Composition

The build material composition includes a polymeric build material. Examples of suitable polymeric materials include a polyamide (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.), a polyolefin (e.g., polyethylene, polypropylene, etc.), a thermoplastic polyamide (TPA), a thermoplastic polyurethane (TPU), a styrenic block copolymer (TPS), a thermoplastic polyolefin elastomer (TPO), a thermoplastic vulcanizate (TPV), thermoplastic copolyester (TPC), a polyether block amide (PEBA), or a combination thereof.

In some examples, the polymeric build material may be in the form of a powder. In other examples, the polymeric build material may be in the form of a powder-like material, which includes, for example, short fibers having a length that is greater than its width. In some examples, the powder or powder-like material may be formed from, or may include, short fibers that may, for example, have been cut into short lengths from long strands or threads of material.

The polymeric build material may be made up of similarly sized particles and/or differently sized particles. In an example, the average particle size of the polymeric build material ranges from about 2 µm to about 225 µm. In another example, the average particle size of the polymeric build material ranges from about 10 µm to about 130 µm. As noted above, the term "average particle size", as used herein, may refer to a number-weighted mean diameter or a volume-weighted mean diameter of a particle distribution.

When the polymeric build material is a crystalline or semi-crystalline material, the polymer may have a wide processing window of greater than 5° C., which can be defined by the temperature range between the melting point and the re-crystallization temperature. In an example, the polymer may have a melting point ranging from about 35° C. to about 300° C. As other examples, the polymer may have a melting point ranging from about 155° C. to about 225° C., from about 155° C. to about 215° C., about 160° C. to about 200° C., from about 170° C. to about 190° C., or from about 182° C. to about 189° C. As still another example, the polymer may be a polyamide having a melting point of about 180° C. or a polypropylene having a melting point of about 160° C.

As discussed herein, other polymers do not have a melting point, but rather have a range of temperatures over which the polymers soften. In some examples, this softening temperature range is from about 130° C. to about 250° C.

In some examples, the polymeric build material does not substantially absorb radiation having a wavelength within the range of 300 nm to 405 nm. The phrase "does not substantially absorb" means that the absorptivity of the polymeric build material at a particular wavelength is 25% or less (e.g., 20%, 10%, 5%, etc.).

In some examples, in addition to the polymeric build material, the build material composition may include an antioxidant, an antistatic agent, a flow aid, or a combination thereof. While several examples of these additives are provided, it is to be understood that these additives are selected to be thermally stable (i.e., will not decompose) at the 3D printing temperatures.

Antioxidant(s) may be added to the build material composition to prevent or slow molecular weight decreases of the polymeric build material and/or to further prevent or slow discoloration (e.g., yellowing) of the polymeric build material by preventing or slowing oxidation of the polymeric build material. In some examples, the antioxidant may be a radical scavenger. In these examples, the antioxidant may include IRGANOX® 1098 (benzenepropanamide, N,N-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 µm or less) that are dry blended with the polymeric build material. In an example, the antioxidant may be included in the build material composition in an amount ranging from about 0.01 wt % to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

Antistatic agent(s) may be added to the build material composition to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material composition.

Flow aid(s) may be added to improve the coating flowability of the build material composition. Flow aids may be particularly beneficial when the build material composition has an average particle size less than 25 µm. The flow aid improves the flowability of the build material composition by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the build material composition.

Printing Methods and Methods of Use

Figure 2:
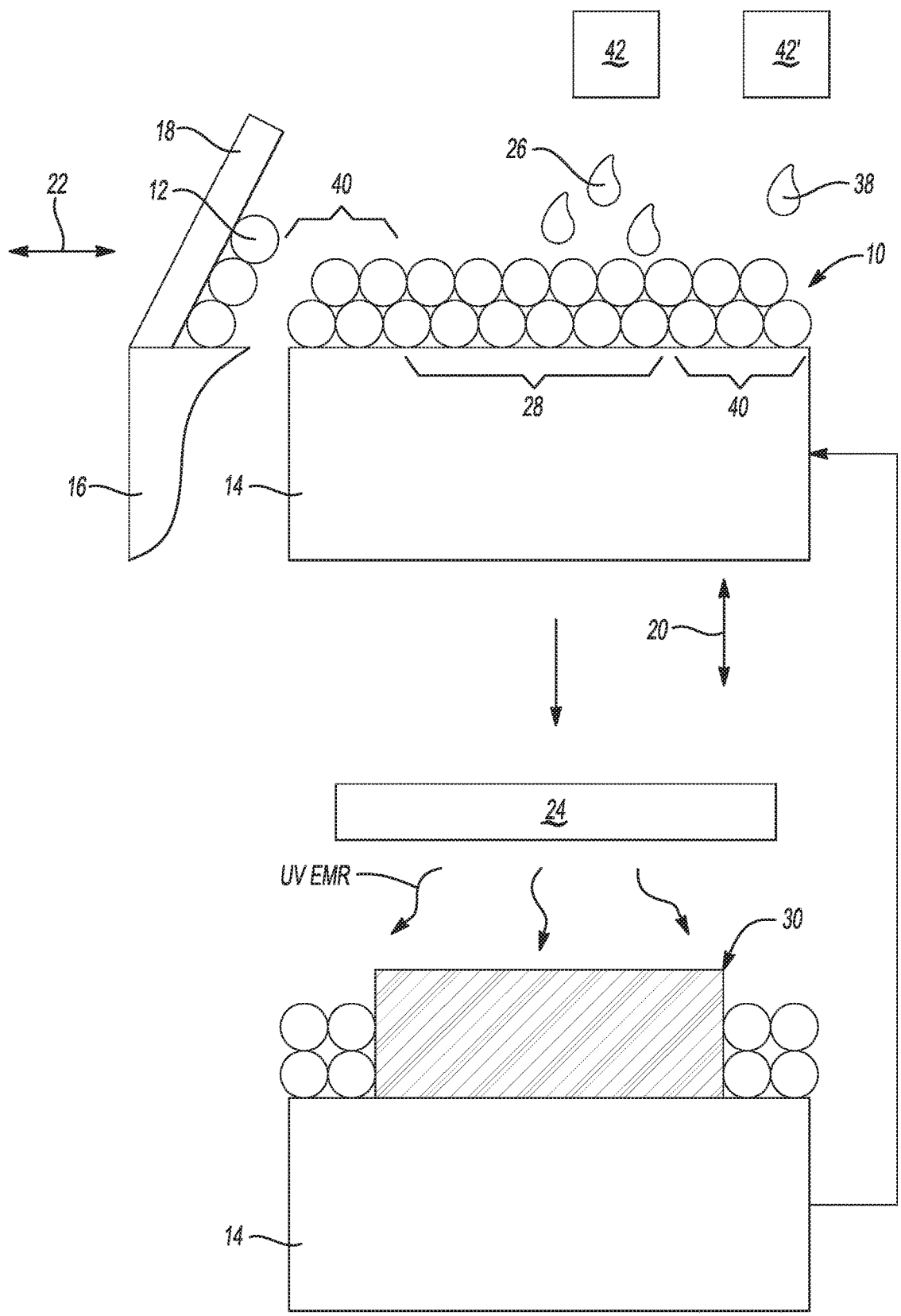
FIG. 2 is a schematic illustration of one example of the 3D printing method of FIG. 1.

An example of the 3D printing method is shown and described in reference to FIG. 1 and FIG. 2.

Prior to execution of any examples of the method, it is to be understood that a controller may access data stored in a data store pertaining to a 3D part/object that is to be printed. For example, the controller may determine the number of layers of the build material composition that are to be formed, the locations at which any of the agents is/are to be deposited on each of the respective layers, etc.

Referring now to FIG. 1 and FIG. 2, an example of the method 100 is depicted. The method 100 shown in FIG. 1 includes applying a polymeric build material composition to form a build material layer (reference numeral 102); based on a 3D object model, selectively applying an ultraviolet (UV) light fusing agent on at least a portion of the build material layer, the UV light fusing agent including: a vehicle including water and a water miscible or water soluble organic solvent; and a multi-functional antioxidant and UV light absorber dispersed in the vehicle, the multi-functional antioxidant and UV light absorber including: a metal oxide particle that is to absorb UV radiation having a wavelength within a range from about 330 nm to about 405 nm; and a passivating agent complexing at least a portion of a surface of the metal oxide particle (reference numeral 104); and exposing the build material layer to UV radiation to coalesce the at least the portion to form a layer of a 3D object (reference numeral 106).

The method 100 is shown schematically in FIG. 2. In FIG. 2, a layer 10 of the polymeric build material composition 12 is applied on a build area platform 14. A printing system may be used to apply the polymeric build material composition 12. The printing system may include the build area platform 14, a build material supply 16 containing the build material composition 12, and a build material distributor 18.

The build area platform 14 receives the polymeric build material composition 12 from the build material supply 16. The build area platform 14 may be moved in the directions as denoted by the arrow 20, e.g., along the z-axis, so that the polymeric build material composition 12 may be delivered to the build area platform 14 or to a previously formed layer. In an example, when the polymeric build material composition 12 is to be delivered, the build area platform 14 may be programmed to advance (e.g., downward) enough so that the build material distributor 18 can push the polymeric build material composition 12 onto the build area platform 14 to form a substantially uniform layer 10 of the build material composition 12 thereon. The build area platform 14 may also be returned to its original position, for example, when a new part is to be built.

The build material supply 16 may be a container, bed, or other surface that is to position the build material composition 12 between the build material distributor 18 and the build area platform 14. The build material supply 16 may include heaters so that the polymeric build material composition 12 is heated to a supply temperature ranging from about 25° C. to about 150° C. In these examples, the supply temperature may depend, in part, on the polymeric build material composition 12 used and/or the 3D printer used. As such, the range provided is one example, and higher or lower temperatures may be used.

The build material distributor 18 may be moved in the directions as denoted by the arrow 22, e.g., along the y-axis, over the build material supply 16 and across the build area platform 14 to spread the layer 10 of the polymeric build material composition 12 over the build area platform 14. The build material distributor 18 may also be returned to a position adjacent to the build material supply 16 following the spreading of the polymeric build material composition 12. The build material distributor 18 may be a blade (e.g., a doctor blade), a roller, a combination of a roller and a blade, and/or any other device capable of spreading the polymeric build material composition 12 over the build area platform 14. For instance, the build material distributor 18 may be a counter-rotating roller. In some examples, the build material supply 16 or a portion of the build material supply 16 may translate along with the build material distributor 18 such that polymeric build material composition 12 is delivered continuously to the build area platform 14 rather than being supplied from a single location at the side of the printing system as depicted in FIG. 2.

The build material supply 16 may supply the polymeric build material composition 12 into a position so that it is ready to be spread onto the build area platform 14. The build material distributor 18 may spread the supplied polymeric build material composition 12 onto the build area platform 14. The controller (not shown) may process "control build material supply" data, and in response, control the build material supply 16 to appropriately position the particles of the polymeric build material composition 12, and may process "control spreader" data, and in response, control the build material distributor 18 to spread the polymeric build material composition 12 over the build area platform 14 to form the layer 10 of the polymeric build material composition 12 thereon. In FIG. 2, one build material layer 10 has been formed.

The layer 10 has a substantially uniform thickness across the build area platform 14. In an example, the build material layer 10 has a thickness ranging from about 50 µm to about 120 µm. In another example, the thickness of the build material layer 26 ranges from about 30 µm to about 300 µm. It is to be understood that thinner or thicker layers may also be used. For example, the thickness of the build material layer 10 may range from about 20 µm to about 500 µm. The layer thickness may be about 2× (i.e., 2 times) the average diameter of the build material composition particles at a minimum for finer part definition. In some examples, the layer thickness may be about 1.2× the average diameter of the build material composition particles.

After the polymeric build material composition 12 has been applied, and prior to further processing, the build material layer 10 may be exposed to heating. In an example, the heating temperature may be below the melting point or melting range of the polymeric material of the polymeric build material composition 12. As examples, the pre-heating temperature may range from about 5° C. to about 50° C. below the melting point or the lowest temperature of the softening range of the polymeric material. In an example, the pre-heating temperature ranges from about 50° C. to about 205° C. In still another example, the pre-heating temperature ranges from about 100° C. to about 190° C. It is to be understood that the pre-heating temperature may depend, in part, on the polymeric build material composition 12 used. As such, the ranges provided are some examples, and higher or lower temperatures may be used.

Pre-heating the layer 10 may be accomplished by using any suitable heat source that exposes all of the polymeric build material composition 12 in the layer 10 to the heat. Examples of the heat source include a thermal heat source (e.g., a heater (not shown) integrated into the build area platform 14 (which may include sidewalls)) or a UV radiation source 24.

After the layer 10 is formed, and in some instances is pre-heated, the fusing agent(s) 26 is selectively applied on at least some of the polymeric build material composition 12 in the layer 10 to form a patterned portion 28.

To form a layer 30 of a 3D object, at least a portion (e.g., patterned portion 28) of the layer 10 of the build material composition 12 is patterned with the fusing agent 26.

The volume of the fusing agent 26 that is applied per unit of the polymeric build material composition 12 in the patterned portion 28 may be sufficient to absorb and convert enough UV radiation so that the polymeric build material composition 12 in the patterned portion 28 will coalesce/fuse. The volume of the fusing agent 26 that is applied per unit of the polymeric build material composition 12 may depend, at least in part, on the metal oxide particles used, the loading of the metal oxide particles in the fusing agent 26, and the polymeric build material composition 12 used.

Some portion(s) 40 of the build material may not be patterned with the fusing agent 26, and thus is/are not to become part of the final 3D object layer 30. However, thermal energy generated during UV radiation exposure may propagate into the surrounding portion(s) 40 that do not have the fusing agent 26 applied thereto. An example of the detailing agent 38 disclosed herein may be selectively applied to the portion(s) 40 of the layer 10. The detailing agent 38 inhibits the propagation of thermal energy, and thus helps to prevent the coalescence of the non-patterned build material portion(s) 40.

After the fusing agent 26 and, in some instances, the detailing agent 38 are selectively applied in the specific portion(s) 28, 40 of the layer 10, the entire layer 10 of the build material composition 12 is exposed to ultraviolet electromagnetic radiation (shown as UV EMR in FIG. 2).

The UV radiation is emitted from the radiation source 24. The length of time the UV radiation is applied for, or energy exposure time, may be dependent, for example, on one or more of: characteristics of the radiation source 24; characteristics of the build material composition 12; and/or characteristics of the fusing agent 26.

It is to be understood that the UV radiation exposure may be accomplished in a single radiation event or in multiple radiation events. In an example, the exposing of the build material composition 12 is accomplished in multiple radiation events. In a specific example, the number of UV radiation events ranges from 3 to 8. In still another specific example, the exposure of the build material composition 12 to electromagnetic radiation may be accomplished in 3 radiation events. It may be desirable to expose the build material composition 12 to UV radiation in multiple radiation events to counteract a cooling effect that may be brought on by the amount of the agents 26, and in some instances 38 that is/are applied to the build material layer 10. Additionally, it may be desirable to expose the polymeric build material composition 12 to UV radiation in multiple radiation events to sufficiently elevate the temperature of the polymeric build material composition 12 in the patterned portion(s) 28, without over heating the build material composition 12 in the non-patterned portion(s) 40.

As described herein, the metal oxide particles of the multi-functional antioxidant and UV light absorber have temperature boosting capacity, and thus enhance the absorption of the UV radiation, convert the absorbed UV radiation to thermal energy, and promote the transfer of the thermal heat to the polymeric build material composition 12 in contact therewith. In an example, the metal oxide particles in the fusing agent 26 sufficiently elevates the temperature of the polymeric build material composition 12 in the portion 28 to a temperature at or above the melting point or within the softening range of the polymeric material, allowing coalescing/fusing (e.g., thermal merging, melting, binding, etc.) of the polymeric build material composition 12 to take place. The application of the UV radiation forms the 3D object layer 30, which may have improved color (e.g., reduced yellow, browning) and overall visual quality.

In some examples, the UV radiation has a wavelength ranging from 300 nm to 405 nm, or from 350 nm to 400 nm, or from 360 nm to 380 nm. Radiation having wavelengths within the provided ranges may be absorbed (e.g., 80% or more of the applied radiation is absorbed) by the metal oxide particles in the fusing agent 26 and may heat the polymeric build material composition 12 in contact therewith, and may not be substantially absorbed (e.g., 25% or less of the applied radiation is absorbed) by the non-patterned polymeric build material composition 12 in portion(s) 40.

After the 3D object layer 30 is formed, additional layer(s) may be formed thereon to create an example of the 3D object. To form the next layer, additional polymeric build material composition 12 may be applied on the layer 30. The fusing agent 26 is then selectively applied on at least a portion of the additional build material composition 12, according to the 3D object model. The detailing agent 38 may be applied in any area of the additional build material composition 12 where coalescence is not desirable. After the agent(s)/formulation(s) 26 and in some instances 38 is/are applied, the entire layer of the additional polymeric build material composition 12 is exposed to UV radiation in the manner described herein. The application of additional polymeric build material composition 12, the selective application of the agent(s) 26 and in some instances 38, and the UV radiation exposure may be repeated a predetermined number of cycles to form the final 3D object 30 in accordance with the 3D object model.

As such, examples of the method 100 include iteratively applying the polymeric build material composition 12 to form respective build material layers 10; selectively applying the UV light fusing agent 26 on the respective build material layers 10 to form respective patterned portions 28; and exposing the respective build material layers 10 to UV radiation.

If it is desirable to impart color to the 3D object that is being formed, the UV light fusing agent 26 may include a colorant. This would impart color to the entire 3D object. In other instances where it is desirable to impart color to a portion of the 3D object (e.g., at some or all of the exterior), the separate colored ink may also be applied with the fusing agent 26 in the patterned portion(s) 28. The colored ink may be deposited in each layer or in the outermost layers. In any of these examples, the colorant of the fusing agent or the colored ink becomes embedded throughout the coalesced/fused build material composition of the 3D object layers 10.

In other examples, the separate colored ink may be applied to the surface of the final 3D object.

In the example method 100, any of the agents (fusing agent 26, detailing agent 38 and/or colored ink) may be dispensed from an applicator 42, 42' (shown in FIG. 2). The applicator(s) 42, 42' may each be a thermal inkjet printhead, a piezoelectric printhead, a continuous inkjet printhead, etc., and the selective application of the fusing agent 26, detailing agent 38 and/or colored ink may be accomplished by thermal inkjet printing, piezo electric inkjet printing, continuous inkjet printing, etc. The controller may process data, and in response, control the applicator(s) 42, 42' to deposit the fusing agent 26, detailing agent 38 and/or colored ink onto predetermined portion(s) of the polymeric build material composition 12. It is to be understood that the applicators 42, 42' may be separate applicators or a single applicator with several individual cartridges for dispensing the respective agents.

It is to be understood that the selective application of any of the fusing agent 26, detailing agent 38 and/or colored ink may be accomplished in a single printing pass or in multiple printing passes. In some examples, the agent(s)/formulation(s) is/are selectively applied in a single printing pass. In some other examples, the agent(s) is/are selectively applied in multiple printing passes. In one of these examples, the number of printing passes ranging from 2 to 4. In still other examples, 2 or 4 printing passes are used. It may be desirable to apply the fusing agent 26, detailing agent 38 and/or colored ink in multiple printing passes to increase the amount, e.g., of the multi-functional antioxidant and UV light absorber, colorant, etc. that is applied to the polymeric build material composition 12, to avoid liquid splashing, to avoid displacement of the build material composition 12, etc.

To further illustrate the present disclosure, examples are given herein. It is to be understood that these examples are provided for illustrative purposes and are not to be construed as limiting the scope of the present disclosure.

EXAMPLES

Example 1

An example of the ultraviolet (UV) light fusing agent disclosed herein was prepared. The example ultraviolet (UV) light fusing agent included both metal oxide particles and a passivating agent. Within the example ultraviolet (UV) light fusing agent, the passivating agent formed a complex with at least some of the metal oxide particle surface group(s).

A comparative UV light fusing agent was also prepared without the addition of the passivating agent.

The formulation of the example ultraviolet (UV) light fusing agent and the comparative example ultraviolet (UV) light fusing agent are shown in Table 1.

TABLE 1

| Ingredient Type | Specific Component | Example UV Light Fusing Agent (wt % active) | Comparative Example UV Light Fusing Agent (wt % active) |
| --- | --- | --- | --- |
| Co-solvent | Propylene Glycol | 20 | 20 |
| Metal Oxide Particles | Titanium Dioxide | ~3.1 | ~3.1 |
| Passivating | Adipic | ~5 | None |

TABLE 1-continued

| Ingredient Type | Specific Component | Example UV Light Fusing Agent (wt % active) | Comparative Example UV Light Fusing Agent (wt % active) |
|---|---|---|---|
| Agent Surfactant | Dihydrazide TERGITOL ® 15-S-9 | 0.9 | 0.9 |
| Water | Deionized water | Balance | Balance |

The example UV light fusing agent was then printed with a thermal inkjet printer to determine the printability and decap performance. A magenta dye was included in the example UV light fusing agent to enhance the visibility of the print. The print results indicated very good decap performance and nozzle health. Thus, the example UV light fusing agents exhibited acceptable printing performance.

The example and comparative example UV light fusing agents were then evaluated for their propensity to yellow when combined with polyamide-12 build material powder. The example and comparative example UV light fusing agents were uniformly dry blended at 10% w/w and melted in a disc shape at 195° C. for 15 minutes to simulate the melt process in a 3D printer. Photographs of these discs were taken, and black and white reproductions are shown in FIG. 3A (disc formed with comparative example UV light fusing agent) and FIG. 3B (disc formed with example UV light fusing agent). The comparative disc (FIG. 3A) was slightly more yellow than the example disc FIG. 3B).

The discs were then aged side-by-side in an oven at 165° C. for varying time intervals (4 hours and 20 hours) before visual analysis. L* and b* measurements were also taken for the 4-hour aged samples.

Photographs of the discs aged for 4 hours were taken, and black and white reproductions are shown in FIG. 4A (disc formed with comparative example UV light fusing agent) and FIG. 4B (disc formed with example UV light fusing agent). The comparative disc (FIG. 4A) was even more yellow than the example disc (FIG. 4B) after 4 hours of aging.

The L* and b* measurements of the 4-hour aged samples were taken using an X-rite® eXact™ spectrophotometer. L* is a measure for lightness/whiteness ranging from black (L*=0) to white (L*=100). Similarly, b* is a measure of blue to yellow, and ranges from blue (negative values) to yellow (positive values). The L* and b* results are shown in Table 2.

TABLE 2

| | Comparative Example Disc | | Example Disc | |
|---|---|---|---|---|
| | L* | b* | L* | b* |
| 4 Hours at 165° C. | 60.43 | 7.46 | 74.82 | 2.54 |
| | 64.09 | 6.81 | 75.29 | 3.25 |
| | 55.95 | 8.66 | 75.05 | 2.83 |
| Average | 60.16 | 7.64 | 75.05 | 2.87 |

The L* and b* values correlated with the visual analysis, indicating that the example disc was much whiter and less yellow than the comparative disc.

Photographs of the discs aged for 20 hours were taken, and black and white reproductions are shown in FIG. 5A (disc formed with comparative example UV light fusing agent) and FIG. 5B (disc formed with example UV light fusing agent). The comparative disc (FIG. 5A) was significantly browner than the example disc (FIG. 5B) after 20 hours of aging.

These results illustrate that the example UV fusing agent is multi-functional in that is effectively fuses the polyamide build material and also results in mitigation of discoloration.

Example 2

The example UV light fusing agent and the comparative UV light fusing agent from Example 1 were used to generate single 3D printed layers.

The polymeric build material was polyamide-12. The polyamide-12 build material was spread out into thin layers. The example UV light fusing agent was inkjet printed in a rectangular pattern on two different build material layers. The comparative example UV light fusing agent was inkjet printed in a rectangular pattern on two different build material layers. The fusing agent loading was approximately 1 drop per pixel.

Figure 7A:
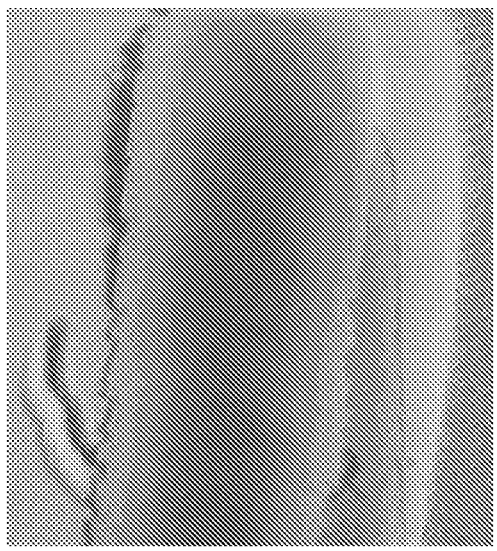
FIGS. 7A and 7B are black and white reproductions of originally colored photographs of, respectively, a comparative example 3D printed object layer (formed with the comparative fusing agent and 2 seconds of UV radiation exposure) and an example 3D printed object layer (formed with the example fusing agent and 2 seconds of UV radiation exposure).

The patterned build material layers were maintained at room temperature and were exposed to UV radiation (395 nm, intensity=12 W/cm$^2$) for either 1 second or 2 seconds. All of the patterned areas formed 3D printed object layers, while the non-patterned areas remained as non-coalesced powder. Photographs were taken of the resulting 3D printed object layers as well as the non-patterned build material surrounding the 3D printed object layer. These photographs are reproduced herein in black and white in FIGS. 6A, 6B, 7A, and 7B. The comparative and example 3D object layers exposed to 1 second of UV radiation are shown, respectively, in FIGS. 6A and 6B. The comparative and example 3D object layers exposed to 1 second of UV radiation are shown, respectively, in FIGS. 7A and 7B.

Figure 7B:
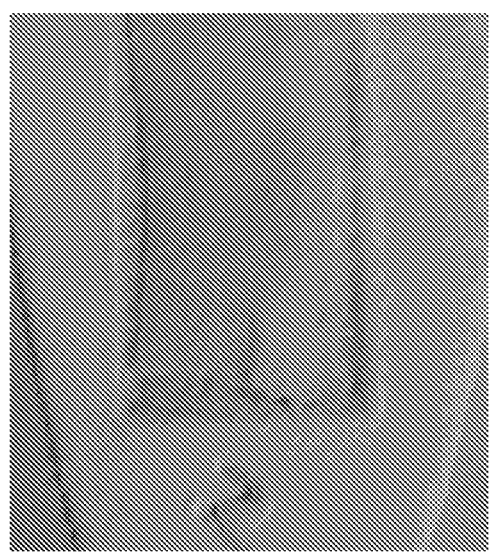

The original colored photographs clearly illustrated that the comparative 3D object layer formed with 1 second of UV exposure (FIG. 6A) was more yellow/brown than the example 3D object layer formed with 1 second of UV exposure (FIG. 6B). In the black and white reproductions, the darker portions of the comparative 3D object layer in FIG. 6A correlate with the portions that were yellow/brown, and the darker portions of the example 3D object layer in FIG. 6B correlate with portions that were white with a tint of light grey. The original colored photographs also clearly illustrated that the comparative 3D object layer formed with 2 seconds UV exposure (FIG. 7A) was a darker brown than the comparative 3D object layer formed with 1 second UV exposure (FIG. 6A), and was much darker than the example 3D object layer formed with 2 seconds of UV exposure (FIG. 7B). In the black and white reproductions, the darker portions of the comparative 3D object layer in FIG. 7A correlate with the portions that were brown, and the darker portions of the example 3D object layer in FIG. 7B correlate with portions that were white with a tint of light grey and/or yellow. These results illustrate that the example UV fusing agent is multi-functional in that is effectively fuses the polyamide build material to form 3D printed object layers and also results in mitigation of discoloration of the 3D printed object layers.

Each of FIGS. 6A, 6B, 7A, and 7B also depicts a scratch in the non-patterned build material. This scratch was made to show that the non-patterned build material did not coalesce like the patterned build material.

It is to be understood that the ranges provided herein include the stated range and any value or sub-range within the stated range, as if that value or sub-range were explicitly recited. For example, from about 5 wt % to about 20 wt % should be interpreted to include not only the explicitly recited limits of from about 5 wt % to about 20 wt %, but also to include individual values, such as about 7.25 wt %, about 10 wt %, about 17 wt %, about 18.5 wt %, etc., and sub-ranges, such as from about 8 wt % to about 18 wt %, from about 11 wt % to about 14 wt %, from about 5 wt % to about 15 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. An ultraviolet (UV) light fusing agent for three-dimensional (3D) printing, consisting of:
    a vehicle consisting of water, a water miscible or water soluble organic solvent, and optionally a surfactant; and
    a multi-functional antioxidant and UV light absorber dispersed in the vehicle, the multi-functional antioxidant and UV light absorber consisting of:
        a metal oxide particle that is to absorb UV radiation having a wavelength within a range from about 330 nm to about 405 nm and an average particle size ranging from about 50 nm to about 950 nm; and
        a passivating agent complexed with at least a portion of a surface of the metal oxide particle,
        wherein the metal oxide particle and the passivating agent are present in a weight ratio of about 1:1.

2. The UV light fusing agent as defined in claim 1 wherein the passivating agent is selected from the group consisting of a dihydrazide, a metal chelator, and combinations thereof.

3. The UV light fusing agent as defined in claim 2 wherein the passivating agent is the dihydrazide, and wherein the dihydrazide is selected from the group consisting of adipic dihydrazide, carbohydrazide, oxalyl dihydrazide, succinic dihydrazide, isophthalic dihydrazide, azelaic dihydrazide, sebacic dihydrazide, dodecanedioic dihydrazide, terephthalic dihydrazide, oxbisbenzene sulfonylhydrazide, and a combination thereof.

4. The UV light fusing agent as defined in claim 2 wherein the passivating agent is the metal chelator, and wherein the metal chelator is selected from the group consisting of citric acid, salicylates, ethylene diamine tetraacetic acid, pentetic acid, phosphonates, a catechol, and combinations thereof.

5. The UV light fusing agent as defined in claim 1 wherein the metal oxide particle is selected from the group consisting of titanium dioxide, zinc oxide, cerium oxide, and combinations thereof.

6. A 3D printing kit, comprising:
    a polymeric build material composition; and
    an ultraviolet (UV) light fusing agent consisting of:
        a vehicle consisting of water, a water miscible or water soluble organic solvent, and optionally a surfactant; and
        a multi-functional antioxidant and UV light absorber dispersed in the vehicle, the multi-functional antioxidant and UV light absorber consisting of:
            a metal oxide particle that is to absorb UV radiation having a wavelength within a range from about 330 nm to about 405 nm and an average particle size ranging from about 50 nm to about 950 nm; and
            a passivating agent complexed with at least a portion of a surface of the metal oxide particle,
            wherein the metal oxide particle and the passivating agent are present in a weight ratio of about 1:1.

7. The 3D printing kit as defined in claim 6 wherein the polymeric build material composition includes a polyamide, a polyolefin, a thermoplastic polyamide, a thermoplastic polyurethane, a styrenic block copolymer, a thermoplastic polyolefin elastomer, a thermoplastic vulcanizate, thermoplastic copolyester, a polyether block amide, or a combination thereof.

8. The 3D printing kit as defined in claim 6 wherein:
    the metal oxide particle is selected from the group consisting of titanium dioxide, zinc oxide, cerium oxide, and combinations thereof; and
    the passivating agent is selected from the group consisting of:
        a dihydrazide selected from the group consisting of adipic dihydrazide, carbohydrazide, oxalyl dihydrazide, succinic dihydrazide, isophthalic dihydrazide, azelaic dihydrazide, sebacic dihydrazide, dodecanedioic dihydrazide, terephthalic dihydrazide, oxbisbenzene sulfonylhydrazide, and a combination thereof;
        a metal chelator selected from the group consisting of citric acid, salicylates, ethylene diamine tetraacetic acid, pentetic acid, phosphonates, a catechol; and combinations thereof; and
        combinations thereof.

9. The 3D printing kit as defined in claim 6, further comprising:
    a colored ink selected from the group consisting of a black ink, a cyan ink, a magenta ink, or a yellow ink; or
    a detailing agent including a surfactant, a co-solvent, and water; or
    both the colored ink and the detailing agent.

10. A method for three-dimensional (3D) printing, comprising:
    applying a polymeric build material composition to form a build material layer;
    based on a 3D object model, selectively applying an ultraviolet (UV) light fusing agent on at least a portion of the build material layer, the UV light fusing agent consisting of:
        a vehicle consisting of water, a water miscible or water soluble organic solvent, and optionally a surfactant;
        a multi-functional antioxidant and UV light absorber dispersed in the vehicle, the multi-functional antioxidant and UV light absorber consisting of:
            a metal oxide particle that is to absorb UV radiation having a wavelength within a range from about 330 nm to about 405 nm and an average particle size ranging from about 50 nm to about 950 nm; and
            a passivating agent complexing at least a portion of a surface of the metal oxide particle, wherein the metal oxide particle and the passivating agent are present in a weight ratio of about 1:1; and exposing the build material layer to UV radiation to coalesce the at least the portion to form a layer of a 3D object.

11. The method as defined in claim 10, further comprising:
iteratively applying the polymeric build material composition to form respective build material layers;
selectively applying the UV light fusing agent on the respective build material layers to form respective patterned portions; and
exposing the respective build material layers to UV radiation.

12. An ultraviolet (UV) light fusing agent for three-dimensional (3D) printing, comprising:
a vehicle including water and a water miscible or water soluble organic solvent; and
a multi-functional antioxidant and UV light absorber dispersed in the vehicle, the multi-functional antioxidant and UV light absorber including:
a metal oxide particle that is to absorb UV radiation having a wavelength within a range from about 330 nm to about 405 nm; and
a passivating agent complexed with at least a portion of a surface of the metal oxide particle, wherein the passivating agent is a dihydrazide selected from the group consisting of adipic dihydrazide, carbohydrazide, oxalyl dihydrazide, succinic dihydrazide, isophthalic dihydrazide, azelaic dihydrazide, sebacic dihydrazide, dodecanedioic dihydrazide, terephthalic dihydrazide, oxbisbenzene sulfonylhydrazide, and a combination thereof,
wherein the metal oxide particle and the passivating agent are present in a weight ratio of about 1:1.

* * * * *